United States Patent
Hameleers et al.

(10) Patent No.: US 9,130,951 B2
(45) Date of Patent: Sep. 8, 2015

(54) METHODS AND DEVICES FOR OPTIMAL SELECTION OF CORE NETWORK NODES IN A CELLULAR COMMUNICATION NETWORK

(71) Applicant: TELEFONAKTIEBOLAGET L M ERICSSON (PUBL), Stockholm (SE)

(72) Inventors: Heino Hameleers, Kerkrade (NL); Frank Hundscheidt, Kerkrade (NL); Martin Kaibel, Herzogenrath (DE); Kathrin Kaibel, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/120,359

(22) Filed: May 14, 2014

(65) Prior Publication Data

US 2014/0369274 A1 Dec. 18, 2014

Related U.S. Application Data

(63) Continuation of application No. 10/221,896, filed as application No. PCT/EP00/11498 on Nov. 18, 2000, now abandoned.

(30) Foreign Application Priority Data

Mar. 21, 2000 (EP) ..................................... 00106112
Nov. 18, 2000 (EP) ..................................... 00976047

(51) Int. Cl.
*H04W 4/00* (2009.01)
*H04L 29/08* (2006.01)
*H04W 48/18* (2009.01)
*H04W 72/04* (2009.01)

(52) U.S. Cl.
CPC .............. *H04L 67/10* (2013.01); *H04W 48/18* (2013.01); *H04W 72/0406* (2013.01)

(58) Field of Classification Search
None
See application file for complete search history.

(56) References Cited

U.S. PATENT DOCUMENTS

| | | | |
|---|---|---|---|
| 5,400,338 A | 3/1995 | Flammer | |
| 5,452,294 A | 9/1995 | Natarajan | |
| 5,577,029 A | 11/1996 | Lu | |
| 5,805,078 A | 9/1998 | Sugiyama et al. | |
| 5,960,362 A * | 9/1999 | Grob et al. | ........ 455/527 |
| 5,978,368 A | 11/1999 | Hjelm et al. | |
| 6,014,558 A | 1/2000 | Thomas | |

(Continued)

OTHER PUBLICATIONS

Monira A., Abu El-Ata M A : "Evolution of Mobile Cellular Communication Systems. The Journey to UMTS" Proceedings of the Seventeenth National Radio Science Conference, 17th NRSC'2000, Feb. 22-24, 2000, pp. 1-17, XP002144275 Minufiya, Egypt.

(Continued)

*Primary Examiner* — Phirin Sam
(74) *Attorney, Agent, or Firm* — Roger S. Burleigh

(57) ABSTRACT

Devices and methods for selecting network nodes in a cellular communication network. By dropping fixed connections between network nodes of different hierarchy levels, for instance, a network node of an access network has to make a selection among different core network nodes. The selected core network node requires service information on the access network node and the area serviced by the access network node. Devices and methods are disclosed for selecting network nodes and for providing service information. The devices can be implemented in the network centrally or in a distributed manner.

15 Claims, 9 Drawing Sheets

(56) References Cited

U.S. PATENT DOCUMENTS

| | | | |
|---|---|---|---|
| 6,131,030 A * | 10/2000 | Schon et al. | 455/438 |
| 6,272,148 B1 * | 8/2001 | Takagi et al. | 370/469 |
| 6,311,054 B1 | 10/2001 | Korpela | |
| 6,330,232 B1 * | 12/2001 | Fapojuwo | 370/342 |
| 6,374,112 B1 * | 4/2002 | Widegren et al. | 455/452.2 |
| 6,542,742 B2 | 4/2003 | Schramm et al. | |
| 6,574,211 B2 | 6/2003 | Padovani et al. | |
| 6,724,733 B1 | 4/2004 | Schuba et al. | |
| 6,792,274 B1 | 9/2004 | Kapanen | |
| 6,798,786 B1 | 9/2004 | Lo et al. | |
| 6,876,634 B1 | 4/2005 | Lim | |
| 6,879,832 B1 * | 4/2005 | Muller et al. | 455/445 |
| 6,970,941 B1 | 11/2005 | Caronni et al. | |
| 7,047,011 B1 | 5/2006 | Wikman | |
| 7,054,268 B1 | 5/2006 | Parantainen et al. | |
| 7,079,656 B1 | 7/2006 | Menzel et al. | |
| 7,089,009 B1 | 8/2006 | Fauconnier | |
| 7,231,046 B1 | 6/2007 | Einola et al. | |
| 7,245,933 B1 * | 7/2007 | Pan et al. | 455/519 |
| 7,260,060 B1 | 8/2007 | Abaye et al. | |
| 2001/0043577 A1 | 11/2001 | Barany et al. | |
| 2002/0006794 A1 | 1/2002 | Vialen et al. | |
| 2004/0190471 A1 | 9/2004 | Bender et al. | |

OTHER PUBLICATIONS

Nakamura H et al: "Applying ATM to Mobile Infrastructure Networks" ISS. World Telecommunications Congress. (International Switching Symposium),CA,Toronto, Pinnacle Group, Sep. 21, 1997), pp. 73-80, XP000720509.

"Technical Specification Group Services and Systems Aspects: Architecture for an All IP Network, 3GPP TR 23.922" 3rd Generation Partnership Project, [Online] Oct. 1, 1999, XP002144276 Retrieved from the Internet: [retrieved on Aug. 3, 2000].

* cited by examiner

METHODS AND DEVICES FOR OPTIMAL SELECTION OF CORE NETWORK NODES IN A CELLULAR COMMUNICATION NETWORK

CROSS-REFERENCE TO RELATED APPLICATIONS

This application is a continuation of U.S. application Ser. No. 10/221,896, filed Apr. 18, 2003, which was the National Stage of International Application No. PCT/EP2000/011498, filed Nov. 18, 2000, which claims the benefit of EP Patent No. 1287713, filed Nov. 18, 2000 and EP Application No. 00106112.6, filed Mar. 21, 2000, the disclosures of which are incorporated herein by reference.

BRIEF SUMMARY OF THE INVENTION

The invention relates, in general, to communications networks and, in particular, to improved methods and devices for optimal selection of core network nodes in a cellular communication network.

BACKGROUND OF THE INVENTION

The invention relates to devices and methods for selecting network nodes for a cellular communication network. It further relates to methods and devices for modifying information scored in said devices for selecting.

In cellular communication networks of the so-called "third generation" new architectures become possible. Said architectures are to allow simplified network adaptations co changing requirements. An important aspect of the new architectures is that so far fixed hierarchic connections between the network nodes are replaced by dynamic hierarchic connections. Fixed connections exist in GSM (Global System for Mobile communication) networks, for instance, between base station controllers and radio base stations or base station subsystems and mobile services switching centers, where each mobile services switching center cooperates with pre-defined base station subsystems.

Communication networks can be split into core networks and access networks and service networks.

The change to dynamic connections affects the cooperation within core networks and access networks as well as between them.

A core network consists of at least one network node, which offers a telecommunication service or administration service, a so-called core network node. The tasks of a core network are, for example, the switching of connections, the mobility management, the charging data acquisition and the storage and administration of subscriber data. Nodes of a core network are, for example, mobile services switching centers, GPRS (General Packet Radio Service) support nodes, home location registers and service control nodes.

An access network is a network enabling at least one subscriber to have access to a core network. Common tasks of an access network are the administration of access resources such as radio frequency channels, the measurement of connection qualities and the cooperation with a core network. Nodes of an access network are, for instance, base station controllers, radio base stations and radio network controllers.

Service networks comprising network nodes for supporting services surpassing the switching of connections are regarded in the present application as a part of the core network. Nodes of said networks are regarded as core network nodes.

One example is the cooperation between core network nodes and access network nodes in networks being constructed according to a new architecture, for instance, so-called "third generation networks". The cooperation between said nodes is handled more flexibly. Thus, no longer only one core network node can cooperate with a plurality of access network nodes, a so-called 1:N relation, but now rather a plurality of access network nodes can cooperate with a plurality of core network nodes in a so-called N:M relation. The technical report of the Third Generation Partnership Project 3G TR 23.922 version 1.0.0, published in October 1999, describes the introduction of cellular communication networks, wherein the connections between network nodes are based on the internet protocol. The internet protocol realizes the dynamic connections between network nodes. A press release by the company Ericsson of Feb. 1, 2000 describes the improved flexibility of this architecture. The architecture makes it possible to react on requests such as, for instance, temporary inhomogeneous traffic load, more flexibly.

It is prior art technology, that by means of the fixed connections between the network nodes, specific network nodes are allocated to each network node within a communication network for cooperating purposes.

U.S. Pat. No. 5,557,029 describes a system and a method for selecting a network node for handling a call in a network with said fixed connections. However, the system and the method are adapted to select a network node in a network with said fixed relation and are not capable of performing a selection in a network with an n:m relation between access network nodes and core network nodes.

Thus, the problem is avoided that a selection has to be made from a plurality of network nodes, for instance, with connection setups, location updates or handovers. This problem arises only with the dynamic allocation of network nodes to each other. Another difficulty resides in the provision of service information. According to the prior art technologies said information are stored in the respective network nodes, in which they are needed. To maintain this solution means—in the case of dynamic allocation—that each network node has to store the service information of all network nodes, with which it can cooperate.

Service information of a network node comprise, data on the service area and the routing area being serviced by the network node, as well as information on the node as such. This is, for instance, the emergency call center, which is switched in the routing area in the case of an emergency, the billing origin and the call origin, both being geographical data on a caller, wherein the first data is required for drafting the bill and the second data is required for processing the call, and local call restrictions, if a subscriber is allowed to phone only in a certain area. The Standard GSM 03.08 version 7.2.0 for handling subscriber data, published in 1998, describes location information and local call restrictions.

The multiple storage of service information of all network nodes brings about the disadvantage that unnecessarily large quantities of data are stored and that said information have to be kept consistent with a large amount of work.

In accordance therewith it is the object of the invention to provide methods and devices for an improved cooperation between network nodes in a cellular communication system.

Moreover, it is an object of the invention to develop methods for providing network nodes with service information on additional network nodes, if required also on service areas or routing areas, in a simplified manner.

It is an advantage that available processing capacities can be optimally exploited. A more even utilization of network nodes is achieved.

It is particularly advantageous that network nodes independently verify internal states and, if required, independently send messages for updating the corresponding entries in selection devices and configuration databases. This facilitates the registration of new nodes and allows a high updating of the data by involving only a small extent of administrative work.

It is moreover advantageous that the well-known data base technology is used. This reduces development costs and avoids downtimes caused by development errors.

Especially advantageous is the enabling or disabling of the selection of nodes by operator commands or settings.

Equally advantageous is the use of a configuration database which enables the provision of service information with a high data consistency and with a small extent of administrative work. Especially advantageous is the automatic updating of the data in a selection device by network nodes, which enables the automatic integration of new network nodes, or of network nodes which had been defect in the meantime, in a communication network.

The storage of free capacities proves to be an advantage. This enables a deliberate selection of network nodes.

Moreover, it proves to be an advantage if only data from network nodes with free capacities are stored. This reduces the number of data records, which have to be administered and searched through in a selection device.

Particularly advantageous is the consideration of distances between network nodes which avoids unnecessarily far connections within a network, thereby saving network capacities.

Furthermore advantageous is the storage of preferred allocations of network nodes in a selection device, which avoids unnecessary accesses to the node capacity memory and possible distance calculations.

Also advantageous is a service information memory. It enables the provision of service information for network nodes in a simple manner.

Further advantageous is the storage of service information in a network node, which avoids unnecessary transmissions of service information and service information requests thereby reducing the data traffic through the network. Equally an advantage is the sending of service information, e.g. by means of a selection device, which reduces the signaling work as no data have to be requested, and it ensures the availability of information in due time.

Another advantage is the automatic sending of service information by a configuration data base, which combines the advantage of the punctual availability of the service information with the advantage of the small extent of administrative work for a central facility.

Further advantageous is the modification of data stored in a node capacity memory for a group of network nodes. By this the selection of several nodes can be enabled or disabled by a single action. This reduces the number of necessary actions for a modification.

Another advantage is the sending of a list of access network nodes after a modification. By this user equipment gets the latest information about valid nodes that can be contacted. This avoids unnecessary attempts to contact invalid nodes or increases the choice of nodes to contact.

Especially advantageous is the contacting of a preferred network node prior to sending a network node request. This reduces the number of network node requests to be processed.

Especially advantageous is the storage of a list of preferred network nodes. This reduces the number of network node requests and thus reduces the data traffic through the network.

BRIEF DESCRIPTION OF THE SEVERAL VIEWS OF THE DRAWINGS

In the following, the invention will be explained by means of figures and embodiments, wherein.

DETAILED DESCRIPTION OF THE INVENTION

Figure 1:
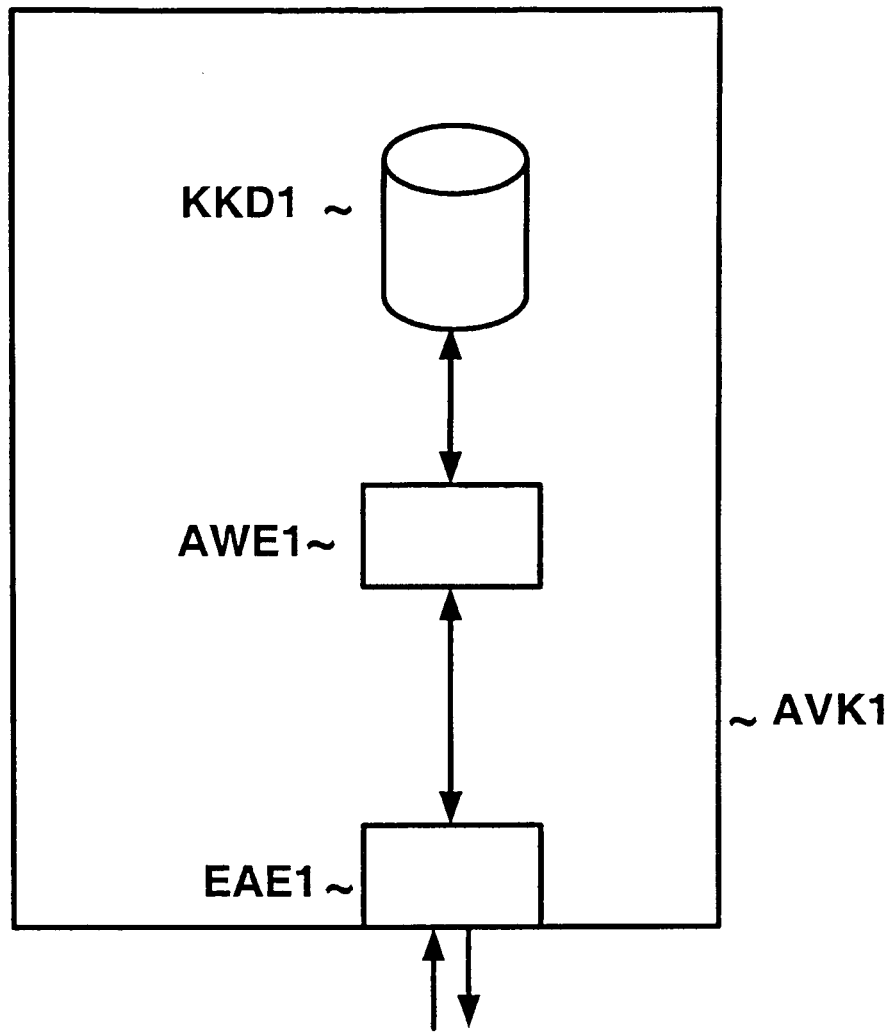
FIG. 1 shows a selection device according to the invention.

In the following, an embodiment of the invention is explained by means of FIG. 1. The inventive selection device AVK1 comprises a node capacity memory KKD1, a processing unit AWE1 and an input/output unit EAE1. Parameters of network nodes are stored in the node capacity memory KKD1. Said information can be limited to an identification of network nodes and the free capacities thereof, or respectively, to the pure identification of network nodes with free capacities.

An update of the node capacity memory KKD1 can be realized in different ways. It takes place, for instance, by means of network nodes, which verify internal states and compare them with pre-specified threshold values, as is described in connection with FIG. 3. Another way is that a counter for each network node is stored in the selection device AVK1, which is incremented to a network node request after the allocation of the network node. This requires an acknowledgment if capacities of the network node are released again, so that the counter can be decremented correspondingly.

A network node request contains at least implicitly data, which specify one or more parameters of a requested network node. Thus, the sender of such a request identifies himself, for instance, by a sender address or by a logic connection via which he sends the request. Said identification enables a determination of the location of the requester. A requester is usually an additional network node or a user terminal. Additional requesters can, for instance, be services or so-called agents.

On the basis of the knowledge of the requester and possibly of the kind of request additional information can, moreover, be obtained, which are then compared with the stored parameters. Said information can, for example, be a desired core network service such as switching, mobility management, charging administration or positioning service, desired telecommunication service such as telephony, facsimile or data transmission, desired kind of switching such as packet or circuit switched, support of a certain standard required such as GSM, GPRS or UMTS, a network node of a certain manufacturer is requested or preferred, a certain, e.g. proprietary protocol has to be supported, a certain version of a software or hardware is preferred or required. Said information or parts thereof can be stored as parameters in the node capacity memory KKD1 of the selection device AVK1.

The processing unit AWE1 selects upon receipt of a network node request by the input/output unit a network node and allocates it to the network node request. If data surpassing a pure identification of a network node are stored in the node capacity memory KKD1, the selection is performed by using such data. The processing unit AWE1 analyzes a network node request for information, which can be obtained from the request, and compares them with the parameters being stored in the node capacity memory KKD1. By means of said comparison it either selects a network node and informs the requester about the selection via the input/output unit EAE1, or it notifies that no network node with the desired requests is available.

Following a message that no network node corresponds to the requests, a negotiation sequence between the selection device and a requester can be started, in which the requester verifies his requests and adjusts them to possibilities offered by the selection device.

If several network nodes are available, which meet the desired requests, the selection can, for instance, take place at random, or, for example, that network node is selected, which is found first. The selection of network nodes can also be supported by a list of preferred allocations of network nodes to each other. Such a list can be provided by means of the mentioned parameters and by means of a, geographical or logic, distance between the network nodes. A logic distance is defined by the number of the transmission means or by delay times between the end points. Basically, possibly short distances are desired, as they require a small amount of work. The distances between network nodes can be calculated from geographical or network-topological data.

Certain protocols on network levels such as the OSPF (Open Shortest Path First) protocol contain information on logic distances and can make them available. For instance, when a request from an additional communication network is received, a selection device can make a selection between different access networks. If, for instance, a 2 Mbit data connection is requested, the selection device will select a wireless local area network as access network for reaching a subscriber.

In a preferred embodiment of the invention, a certain network or sub-network can be selected. Such a network or sub-network may be, for example, an access network, or a core network or parts of said networks.

FIG. 1 shows an embodiment of the invention; wherein a memory unit is realized to store preferred allocations within the node capacity memory KKD1.

A selection device does not necessarily have to be realized as a central facility in a network. Depending on the network situation it may be useful to place individual elements of the selection device at different places in the network. Another useful embodiment of the invention is to realize the selection device as a whole or in parts with identical contents or identical function at several places in the network. A possibility is the formation of domains within the network, each of which are serviced by one selection device. A selection device servicing such a domain can be limited during the storage of information to those information, which belong to network nodes of the domain or, respectively, to areas being serviced by network nodes of the domain. The data stored in the domains can also be updated by a central selection device.

A selection device can be realized as a stand-alone tangible device, a so-called "stand alone device", or together with other network nodes. Examples for mutual realizations are the device together with a home location register, an access network node or a core network node.

Figure 2:
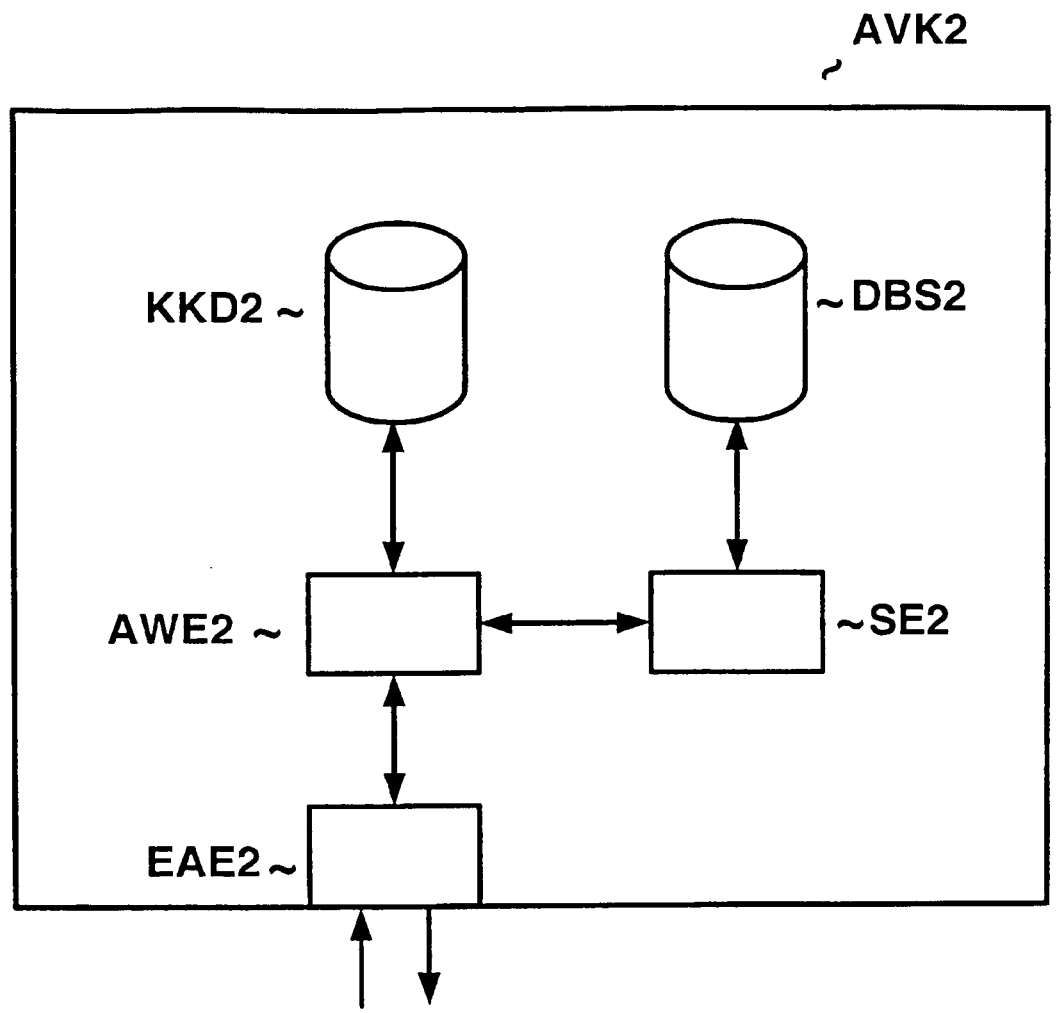
FIG. 2 shows an additional selection device according to the invention.

FIG. 2 shows a selection device AVK2 comprising in addition to the elements depicted in FIG. 1 a service information memory DBS2 and a selection unit SE2. The service information memory DBS2 contains service information. Said information are searched through by the selection unit SE2, if required, filtered and transmitted by the input/output unit EAE2 to a selected network node.

The selection unit SE2 receives from the processing unit AWE2 at least an identification of the requesting network node. By means of said identification the selection unit identifies information contained in the service information memory DBS2. The selection unit SE2 contains additional information, e.g. information on the hardware and software of the selected network node or standards to be supported. By means of said information the selection unit SE2 filters the service information, which it transmits to the core network node via the input/output unit EAE2. This filtering takes place, as different core network nodes require or, respectively, can process different service information. In an alternative embodiment of the invention the filtering of the service information takes place only in the receiving network node.

Figure 3:
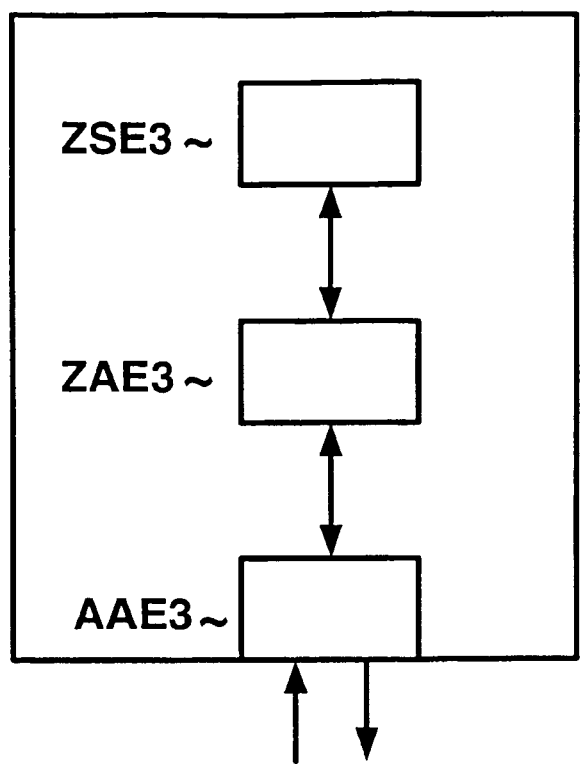
FIG. 3 shows a network node according to the invention.

FIG. 3 shows a network node KDK3 according to the invention as an example of a network node according to the invention. The network node KDK3 comprises an updating unit AAE3, a memory unit ZSE3 and a state-analyzing unit ZAE3. The state analyzing unit ZAE3 analyzes internal states of the core network node KDK3 such as capacity utilization, number of connections of one kind of connection, number of connections set up according to a certain standard, number of connections for a certain telecommunication service such as facsimile, telephony, data transmission or optional combinations from the above.

The information can on one hand be used for determining in how far individual resources being administered by a core network node are fully utilized. On the other hand, a network operator can, for instance, prefer services, protocols, access networks or transmission methods by adjusting threshold values in the network node KDK3, which are evaluated by the updating unit AAE3. Thus, by setting low threshold values for services, which are remunerated only to a small extent, he can prefer services with a higher remuneration. Said threshold values are stored in the updating unit AAE3.

The updating unit AAE3 evaluates the data determined by the state analyzing unit ZAE3 and compares them with stored threshold values. Said evaluation can reasonably take place in dependence on the parameters stored in a node capacity memory KKD1 or KKD2, or in dependence on the parameters stored in a selection device AVK1 or AVK2. The result of the evaluation is thereafter compared with the result of the previous evaluation. The result of the previous evaluation is stored in the memory unit ZSE3. If the updating unit AAE3 establishes that there is a discrepancy between the stored and the updated result, it updates the parameters by sending a message to the selection device. Said adjustment can also be performed for individual parameters. If a parameter value is "free capacities" for circuit switched connections, the updating unit AAE3 de-registers the network node KDK3 in the selection device as soon as the capacity utilization threshold for said kind of connection is exceeded. In order to avoid a multiplicity of updates it is purposeful to plan a certain hysteresis between threshold values for a measured quantity. Thus, the threshold value for setting the parameter "capacities" to "free capacities exist" of the core network node KDK3 in a selection device AVK1 or AVK2 can be at a capacity utilization of 40%, the threshold value for setting the parameter to "no capacities available" of the network node KDK3, however, can be at a capacity utilization of 95%. Also possible is the indication of precise values such as 10% capacity utilization instead of the indications available or unavailable capacities. By quantizing the precise values, the number of updates can be limited. If a network node registers itself in its entirety in the selection device, e.g. after a defect or because it has its first performance in the network, it preferably sends information to all parameters, which are stored in the selection device. A cost control server will, for example, register itself among others with those protocols which are supported thereby, e.g. RADIUS, CAP, DIAMETER and the like. A positioning server will, for example, indicate the accuracy, with which it can determine a position of a user terminal.

In an alternative embodiment of the invention, the parameter "free capacities" is implicitly updated by a network node without free capacities not being stored in the processing unit and being registered again only, when it registers itself anew with free capacities.

The method of independent registration or updating of a network node enables the integration of new or restored network nodes in the network by registration into the selection device.

Figure 4:
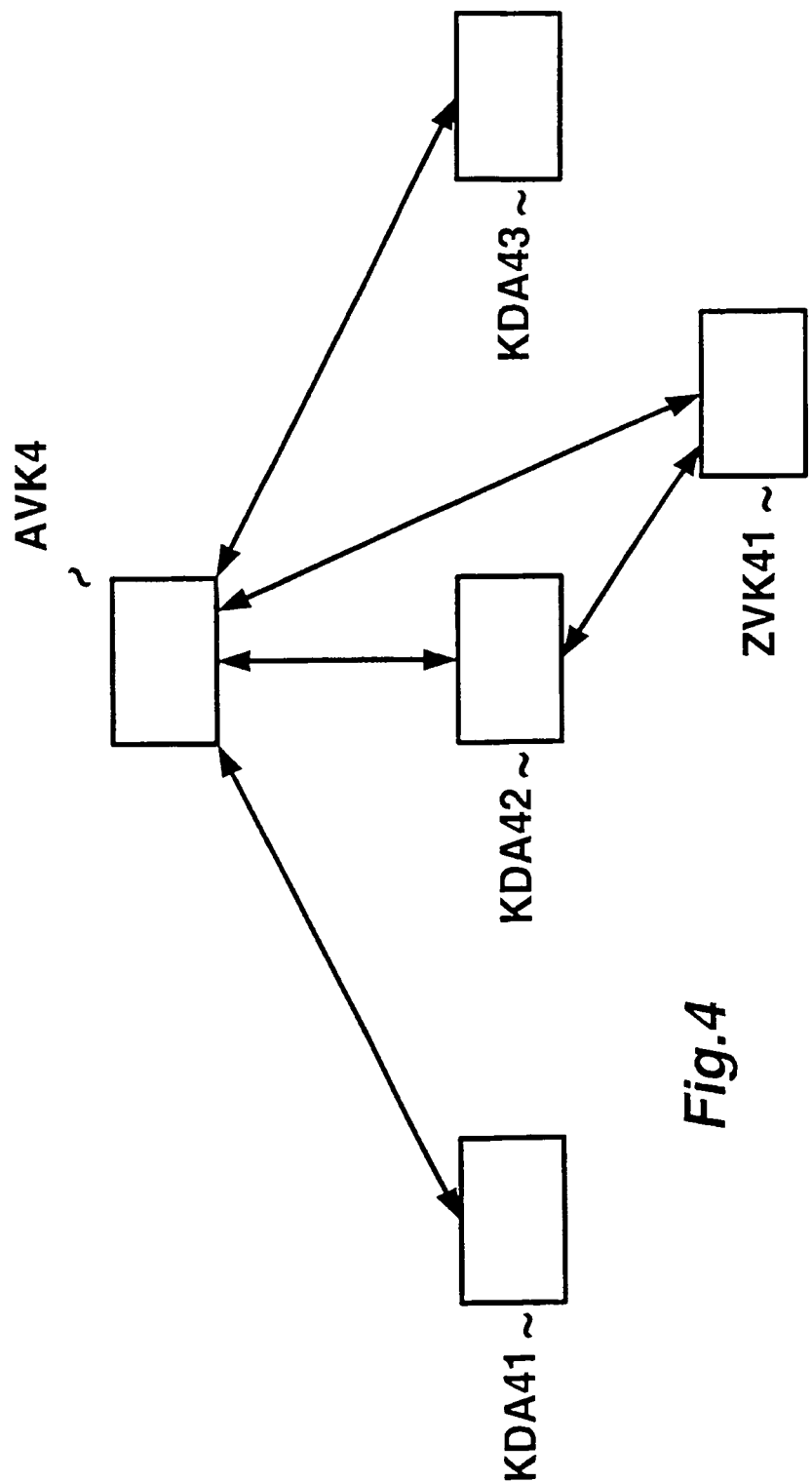
FIG. 4 shows a communication network according to the invention.

FIG. 4 shows a core network comprising three core network nodes KDA41, KDA42 and KDA43, a selection device AVK4 as well as an access network node ZVK41. Such an access network node can, for instance, be a base station controller or a radio network controller. The access network node ZVK41 requests a core network node according to the following method. In a first step, the access network node ZVK41 recognizes that it has to cooperate with a core network node, e.g. for a connection setup. It establishes the requests to the core network node and sends a network node request to the selection device AVK4. A network node request can, for example, be a location updating request or an attachment. The selection device AVK4 selects a core network node KDA42 and sends an identification of the selected core network node KDA42 to the access network node ZVK41. The access network node ZVK41 receives the identification and continues with the respective procedure, which required the core network node KDA42, e.g. a location updating, a call setup or an attachment. The network node identification can be an address of the selected core network node KDA42. As an alternative to the represented procedure, the access network node ZVK41 can contact a preferred core network node KDA41 first. If this contact is successful, i.e. if the intended cooperation can take place, it does not send a message to the selection device AVK4, but continues directly with the respective procedure, which required a core network node. If the contacting is not successful, e.g. as the contacted core network node has no free capacities or is defect, the access network node ZVK41 proceeds further as is described above by sending a message to the selection device AVK4.

Figure 5:
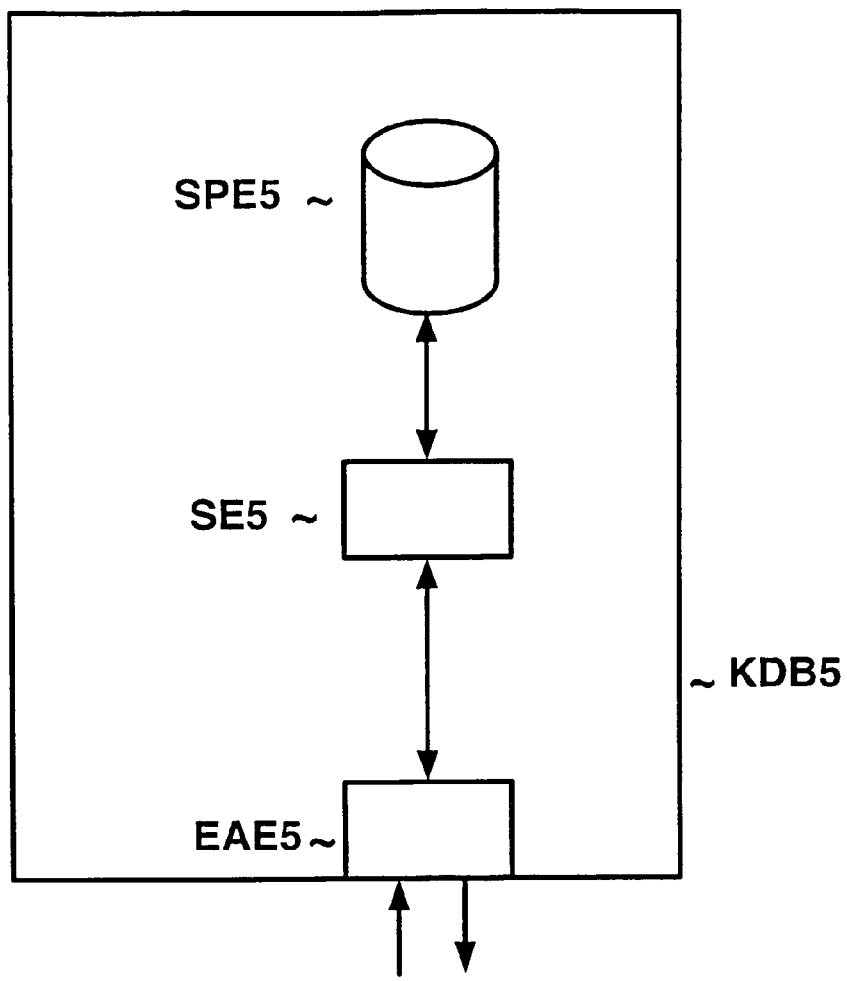
FIG. 5 shows a configuration data base according to the invention.

FIG. 5 shows a configuration data base KDB5 comprising a memory unit SPE5, a selection unit SE5 and an input/output unit EAE5. Service information from network nodes are stored in the memory unit. The selection unit SE5 filters service information of a network node, in order to adjust them to the requirements of the receiver of the data. Thus, a receiver may, for instance, require the data in a specific format or may process only selected information. The input/output unit EAE5 receives requests concerning network nodes and sends the filtered data to the respective receiver.

It is a preferred alternative to store the data not in individual network nodes, but to store and administer them centrally in the configuration database KDB5. This reduces the administration work and enables a higher data consistency with a smaller extent of administration work.

A configuration database can be provided as a central database, or as a distributed system or replicated system. A configuration database does not necessarily have to be realized as a central installation in a network. Depending on the network situations it may be useful, to place individual elements of the configuration database at different places in the network. Another expedient embodiment of the invention resides in realizing the configuration database as a whole or in parts with identical contents or identical function at several places in the network. One possibility is the formation of domains within the network each being serviced by one configuration database. A configuration database servicing such a domain can during the storage of service information restrict itself to those information, which belong to network nodes, routing areas or service areas within the domain. The data stored in the domains can also be updated by a central configuration database.

In the following, the invention is explained in more detail by means of FIG. 6. Upon its installation, a user terminal UE6 registers itself in an access network node RBS6 for the first time. Such an access network node can, for instance, be a base station controller, a radio base station, a radio network controller or a node of a WAN (Wireless Local Area Network). In the embodiment a UMTS network is used, without restricting the invention to such a network, wherein the network nodes communicate with each other via IP (Internet Protocol) connections. The user terminal UE6 contacts a radio base station RBS6 in a first step 601. The radio base station RBS6 selects a preferred radio network controller RNC6 from a stored list of preferred network nodes and successfully contacts the same in step 602. A network node request to a selection device for selecting a radio network controller thereby becomes unnecessary. The radio base station RBS6 connects the user terminal UE6 with the radio network controller RNC6.

In another step 603 the user terminal UE6 sends an attachment to the radio network controller RNC6. As there is no fixed allocation of core network nodes to access network nodes, the radio network controller RNC6 has to establish a core network node for the processing of the attachment. In a preferred embodiment the radio network controller RNC6 comprises a memory for storing a list of preferred network nodes. The radio network controller RNC6 selects a preferred core network node MSC61 from this list and contacts it in step 604. If said core network node MSC61 is not available, e.g. due to a defect or overload, the radio network controller RNC6 contacts in a next step 605 a selection device AVK6 by sending a network node request. The input/output unit EAE6 of the selection device AVK6 forwards the network node request to the processing unit AWE6 in another step 606. The processing unit AWE6 recognizes from the IP address of the sender the requesting radio network controller RNC6. Moreover, it can infer from the contents of the network node request, that a UMTS-capable terminal performs an attachment and that the terminal registers itself for circuit switched and packet switched services. In a next step 607, the processing unit AWE6 searches in the node capacity memory KKD6 for the parameters "supports UMTS protocol", "supports circuit switching" and "supports packet switching". The list with the results is compared with a list of preferred core network nodes. There are no agreements, as the defect core network node is not registered as network node with free capacities. A defect core network node can, for instance, be recognized in that the usual signaling traffic can no longer be performed with or via said node. A network node recognized as being defect is deleted from the memory or receives a corresponding entry.

As there is no preferred core network node, the processing unit AWE6 of the selection device AVK6 calculates the distances of the individual core network nodes to the radio network controller RNC6. The calculation can, for example, take place on the basis of location coordinates, which are stored as a parameter of the network nodes. Alternatively, already previously stored deletions can be used, or network nodes are allocated to individual sectors of the network. From the core network nodes, which were found as possible nodes after the verification of the parameters, the core network node MSC62 being in the shortest distance to the requesting radio network controller RNC6 is selected by the processing unit AVK6.

If the nodes RNC6 and MSC62 do not cooperate regularly, the service information for the radio network controller RNC6 are not stored in the core network node MSC62. In a preferred embodiment, the data are not stored in individual network nodes, but are stored and administered centrally in a configuration database.

This reduces the administration work and enables a higher data consistency with a smaller extent of administration work. In additional steps 608 and 609, the processing unit AWE6 transmits the IP address of the selected core network node MSC62 via the input/output unit EAE6 to the requesting radio network controller RNC6. The processing unit AWE6 filters the present service information, in this case data of the radio network controller RNC6 and information on the service area and the routing area thereof. The filtering takes place in correspondence with the software and the hardware of the core network node MSC62. Thereafter the selection device AWE6 sends in a next step 610 the filtered data to the core network node MSC62. In a preferred embodiment the filtering takes place only in the receiving network node MSC62. In another step 611 the radio network controller RNC6 contacts the core network node MSC62. The subsequent attachment procedure takes place according to prior art technology.

Figure 7:
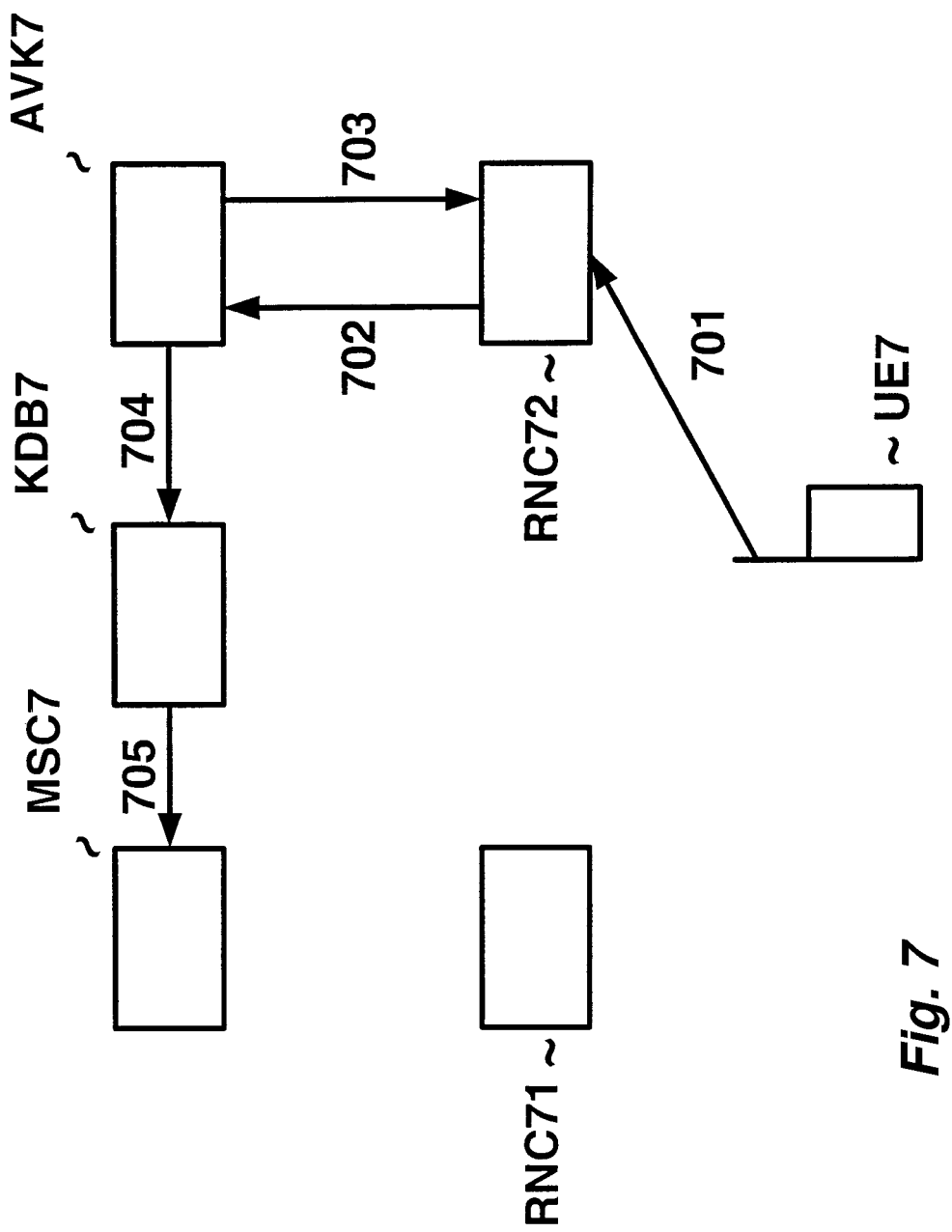
FIG. 7 shows a selection of a network node according to the invention for a location updating request.

FIG. 7 describes a location updating request. Upon the successful conclusion of an attachment of a terminal UE7, said terminal UE7 changes from the service area of a first radio network controller RNC71 to the service area of another radio network controller RNC72. The dynamic connections between network nodes in this case make it feasible to maintain the already selected core network node MSC7, also if this commonly does not cooperate with the new radio network controller RNC72. In a first step 701 the user terminal UE7 sends a location updating request to the presently servicing radio network controller RNC72. Said location updating request contains at least an identification of the core network node MSC7, which so far cooperates with the user terminal UE7. Said information is contained in user terminals. As an alternative to the transmission of the identification the core network node MSC7 can also be requested by an inquiry of the selection device AVK7 in a home location register. Another possibility consists in the storage of the servicing core network node as parameter in the selection device.

The updated radio network controller RNC72 sends in another step 702 a network node request to the selection device AVK7 and thereby transmits the identification of the previous core network node MSC7.

The selection device AVK7 selects a network node by taking into account the requests and the previous core network node MSC7. In a next step 703, it thereafter transmits an identification of the selected network node to the updated radio network controller RNC72. In the example, the previous core network node MSC7 is maintained.

If the core network node MSC7 does not usually cooperate with the updated radio network controller RNC72, a selection device AVK7 sends in a next step 704 a message to the configuration database KDB7. The message contains an identification of the updated radio network controller RNC72, an identification of the core network node MSC7 as well as information on the software and hardware of the core network node. The input/output unit of the configuration database KDB7 receives said message and forwards it to the selection unit. The selection unit loads the service information of the radio network controller RNC72 from the memory unit and filters them in correspondence with the software and hardware versions of the core network node. In a next step 705 the input/output unit transmits the filtered service information to the core network node MSC7. Thereafter, the core network node MSC7 starts in the known manner with the location updating.

In a preferred embodiment the filtering takes place in the receiving core network node. If a once selected core network node is maintained, both the request in the selection device and the transmission of a core network node identification are dropped. Instead, a request for service information is made in the configuration database. The request and the response thereto take place between core network nodes and configuration database. The represented steps 701, 702, 703, 704 and 705 are equally performed for a handover request.

Figure 8:
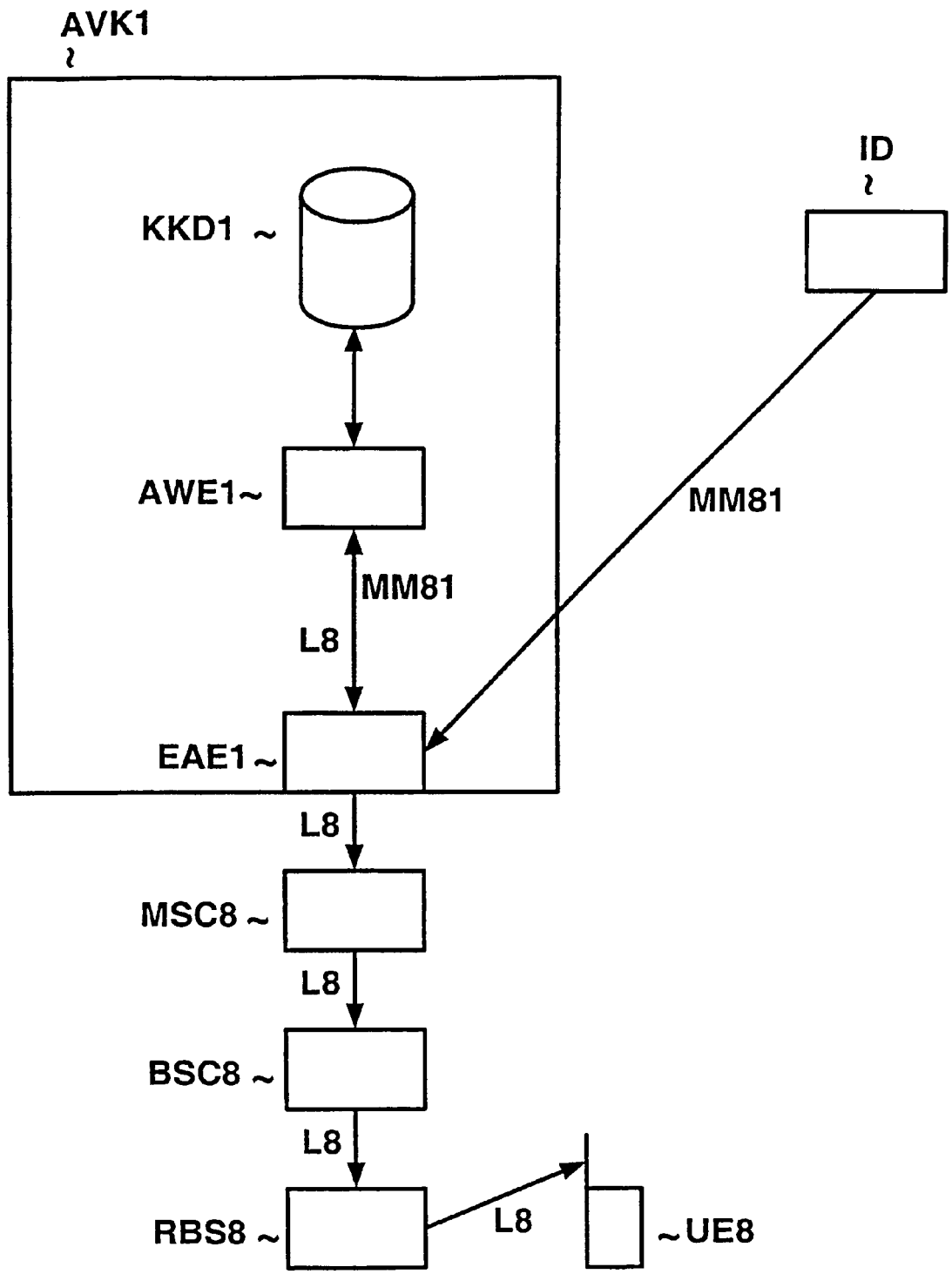
FIG. 8 shows a modification of data stored in a node capacity memory.

FIG. 8 depicts a modification of data stored in a node capacity memory. An operator enters a request to disable the selection of a group of network nodes, here all nodes belonging to a certain access network. The identification of said nodes could be performed in several ways. One way is the storing of a parameter value for each group a node belongs to. A further way is to identify each of the nodes by a node identification like its address. In the example, an input device ID translates the identification of a group into a group of node identifications.

The operator enters an operator command via the input device ID. Said input device can be any terminal, offering an interface between an operator and a network, for example an operations and maintenance terminal. The input device sends the operator command as a modification message MM81 to the input/output unit EAE1 of the selection device AVK1. The input output unit EAE1 forwards the modification message MM81 to the processing unit AWE1. The processing unit AWE1 processes the message and modifies the respective entries in the node capacity memory KKD1.

If the selection of a node shall be disabled, this can be performed for example by removing its entry in the node capacity memory or by changing a parameter to a value indicating that the node cannot be selected. If the selection of a node shall be enabled, this can be implemented by inserting an entry for said node or by modifying a parameter to a value that indicates that the node can be selected. The processing unit AWE1 generates a list L8 of access networks that can be contacted by user equipment. It sends the list to the input/output unit EAE1. The input output unit forwards the list L8 via several network nodes MSC8, BSC8, RBS8 to a user equipment UE8.

Figure 9:
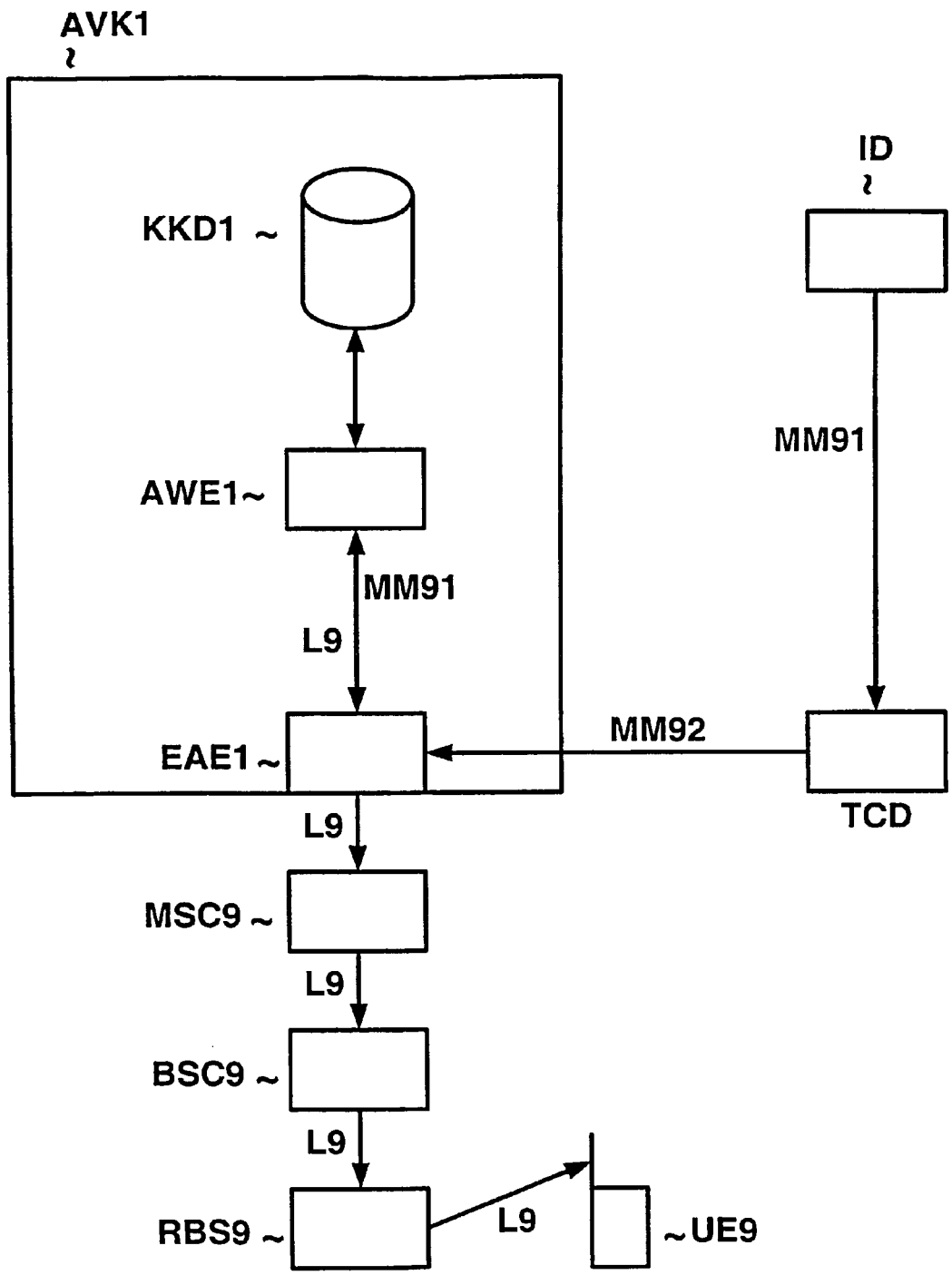
FIG. 9 shows a further modification of data stored in a node capacity memory.

FIG. 9 depicts a further modification of data stored in a node capacity memory KKD1. The processing unit AWE1, the node capacity memory KKD1 and the input/output unit EAE1 are the same as described in FIG. 8. In the depicted case, an operator enters a request to disable the selection of a group of network nodes. The operator requests that nodes of said group cannot be selected under certain circumstances. Such circumstances are for example that these nodes can only be selected during at times or if no other nodes are available. A reasonable scenario is that the nodes belong to an access network leased by the operator. The operator prefers to use access network nodes that belong to his own network. However, at peak hours, the selection of the leased access network nodes is permitted. FIG. 9 depicts the handling of such a conditional enabling/disabling by an external device TCD.

In another embodiment of the invention, the conditional enabling/disabling is handled by the processing unit AWE1 of a selection device. In the example, the operator request for a conditional enabling/disabling of a group of network nodes is sent in a modification message MM91 to the external device TCD. The external device TCD monitors the condition, e.g. the time of day, the day of week, or internal states of the telecommunication network. If the condition is fulfilled, the external device sends a modification message MM92, comprising either the request for enabling or disabling the group of network nodes to the input/output unit EAE1 of the selection device AVK1. The modification message MM92 is handled similar to the modification message MM81 in FIG. 8. It results in the modification of the node capacity memory KKD1 and a list L9 that is sent to a user equipment UE9. Again the list is sent via several network nodes MSC9, MBSC9 and RBS9. The way the list takes is just an example and does not limit the scope of the invention to lists sent via several network nodes.

The mechanism of enabling or disabling a group of network nodes can be used, for example, to support the preferences according to owners or operators of networks, to protocols or to nodes produced by a certain supplier.

In an embodiment of the invention, the lists L8, L9 are sent to the user equipment UE8, UE9 by using a common coordination channel. A common coordination channels a logical channel used for coordination purposes between a core network and user equipment.

In a further embodiment of the invention, the lists are sent during an attachment or handover of user equipment.

Figure 6:
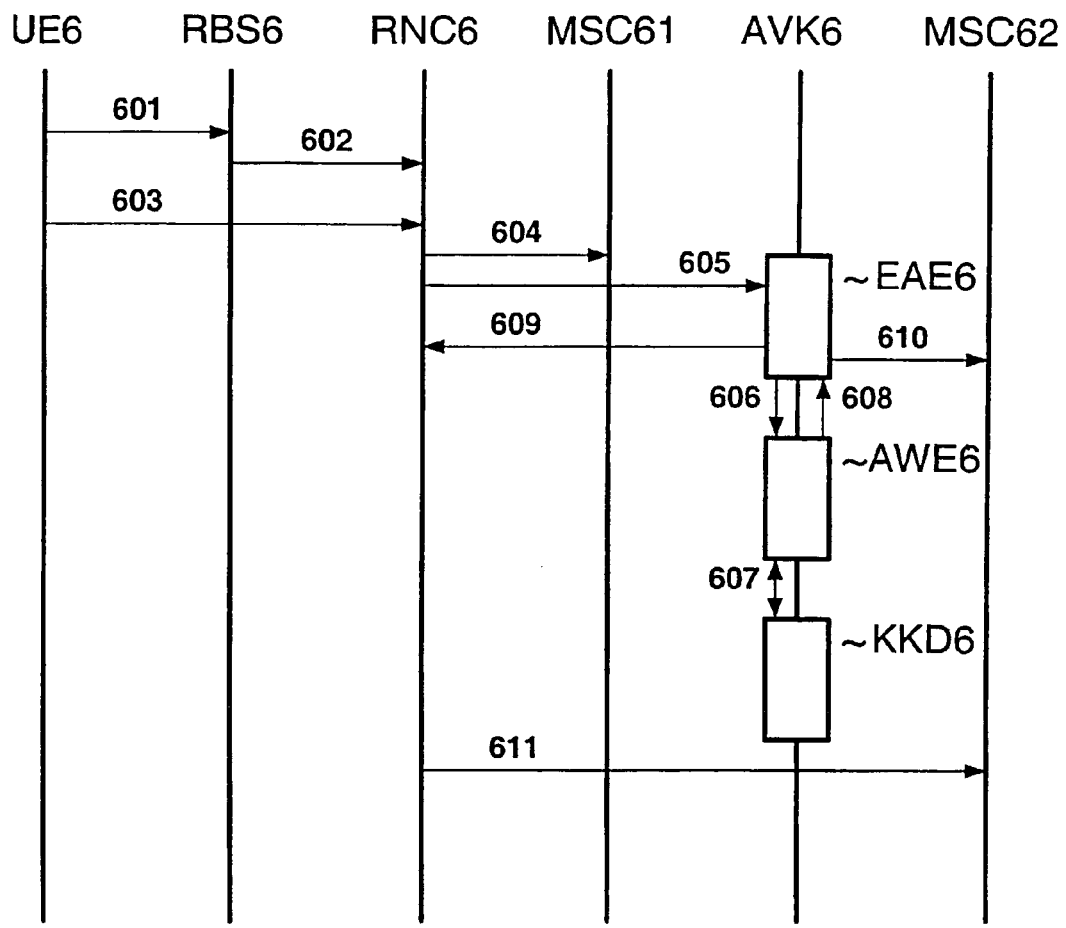
FIG. 6 shows a selection of a network node according to the invention for an attachment of a terminal.

In an embodiment of the invention, a message is sent to at least one further network node that stored a list of preferred nodes as mentioned in the description of FIG. 6. The message comprises an identification of the at least one network node that is enabled disabled from being selected The at least one further network node updates its list of preferred nodes m accordance with the message if appropriate. The list is updated, for example, in two cases. The first case is that a node that is disabled from being selected is m the list of preferred nodes of the further node. In this case the node would be removed from said list. The second case is that a server that is enabled of being selected has been removed from said list because of a former disabling. In this case the node would be added to the list.

The introduced methods can be implemented m the network nodes, for instance, by means of control software. In particular, the method for selecting a network node can be realized entirely or partially as software m one or several selection devices as well as m configuration databases. Also, the methods for controlling a network node can be executed by a software.

The invention is not limited to the represented examples. It can be applied m all cellular communication networks. The contacting of the selection device or the configuration database not only takes place with the attachment of a terminal, a call handover or the location updating. It can take place at optional times.

We claim:

1. A radio access network node having a device for selecting a core network node in a cellular communication network, the cellular communication network comprising a plurality of radio access network nodes and a plurality of core network nodes, wherein said radio access network node is capable of cooperating with more than one of said plurality of core network nodes, said radio access network node comprising:
    an input/output unit for receiving a network node request and for releasing a network node identification of the network node allocated to the network node request;
    a node capacity memory for storing parameters related to each of said plurality of core network nodes; and,
    a processing unit for analyzing network node requests and for selecting one of said core network nodes by means of the analysis result and the parameters stored in the node capacity memory.

2. The radio access network node according to claim 1, wherein one of the stored parameters indicates whether a core network node has free capacity.

3. The radio access network node according to claim 2, wherein an entry in the node capacity memory for a core network node is deleted if the value of a parameter indicating whether the core network node has free capacity is below a threshold value.

4. The radio access network node according to claim 1, wherein the processing unit takes into account distances between core network nodes when selecting one of said plurality of core network nodes.

5. The radio access network node according to claim 1, wherein the selection of a core network node is supported by a list of preferred allocations of core network nodes to each other.

6. The radio access network node according to claim 1, further comprising:
    a service information memory for storing service information;
    a selection unit for selecting service information for the selected core network node; and,
    an input/output unit additionally sending service information to the selected core network node or a visitor location register allocated thereto.

7. A method in a radio access network node for selecting a core network node in a cellular communication network, wherein the cellular communication network comprises a plurality of radio access network nodes and a plurality of core network nodes, wherein said radio access network node is capable of cooperating with more than one of said plurality of core network nodes, said method comprising the steps of:
    receiving a modification message for at least one of said plurality of said core network nodes;
    comparing the content of the modification message with entries in a core network node capacity memory; and,
    enabling or disabling, as a function of said comparing, a selection of the at least one core network node according to the content of the modification message by modifying the respective at least one entry in the core network node capacity memory for said at least one core network node.

8. The method according to claim 7, wherein the modification message includes information to change the possible selection of a group of core network nodes.

9. The method according to claim 7, further comprising the step of sending an identification of radio access network nodes that can be contacted by user equipment to at least one user equipment.

10. A method in a radio access network node for selecting a core network node in a cellular communication network, the cellular communication network comprising a plurality of radio access network nodes and a plurality of core network nodes, wherein said radio access network node is capable of cooperating with more than one of said plurality of core network nodes, said method comprising:

receiving a network node request and releasing a network node identification of a core network node allocated to the network node request;

storing, in a node capacity memory, parameters related to each of said plurality of core network nodes; and, analyzing network node requests and selecting one of said core network nodes by means of the analysis result and the parameters stored in the node capacity memory.

11. The method according to claim 10, wherein one of the stored parameters indicates whether a core network node has free capacity.

12. The method according to claim 11, wherein an entry in the node capacity memory for a core network node is deleted if the value of a parameter indicating whether the core network node has free capacity is below a threshold value.

13. The method according to claim 10, wherein the step of selecting takes into account distances between core network nodes when selecting one of said plurality of core network nodes.

14. The method according to claim 10, wherein the selection of a core network node is supported by a list of preferred allocations of core network nodes to each other.

15. The method according to claim 10, further comprising the steps of:

storing service information in a service information memory;

selecting service information for the selected core network node; and, sending service information to the selected core network node or a visitor location register allocated thereto.

* * * * *